United States Patent
Wang et al.

(10) Patent No.: US 11,126,284 B2
(45) Date of Patent: Sep. 21, 2021

(54) TOUCHPAD ASSEMBLY

(71) Applicants: Maintek Computer (Suzhou) Co., Ltd, Suzhou (CN); PEGATRON CORPORATION, Taipei (TW)

(72) Inventors: Lu Wang, Suzhou (CN); Xue-Bing Cheng, Suzhou (CN); Chun-Yen Huang, Taipei (TW)

(73) Assignees: MAINTEK COMPUTER (SUZHOU) CO., LTD, Suzhou (CN); PEGATRON CORPORATION, Taipei (TW)

( * ) Notice: Subject to any disclaimer, the term of this patent is extended or adjusted under 35 U.S.C. 154(b) by 0 days.

(21) Appl. No.: 16/811,009

(22) Filed: Mar. 6, 2020

(65) Prior Publication Data
US 2020/0319728 A1   Oct. 8, 2020

(30) Foreign Application Priority Data
Apr. 3, 2019   (CN) .......................... 201910265024.2

(51) Int. Cl.
*G06F 3/0354*   (2013.01)

(52) U.S. Cl.
CPC ...... *G06F 3/03547* (2013.01); *G06F 3/03548* (2013.01)

(58) Field of Classification Search
CPC . G06F 3/03547; G06F 3/03548; G06F 3/0354
See application file for complete search history.

(56) References Cited

U.S. PATENT DOCUMENTS

2010/0254743 A1* 10/2010 Cong ...................... H04M 1/23 400/488
2018/0284940 A1* 10/2018 Chin ...................... G06F 3/0416
2020/0004354 A1* 1/2020 David ................... G06F 3/0488

FOREIGN PATENT DOCUMENTS

CN   2906742 Y   5/2007
TW   M502895 U   6/2015

OTHER PUBLICATIONS

English language translation of TW M502895 Patent, Oct. 9, 2020, pp. 1-11.*
Dictionary.com, "adjacent," in Dictionary.com Unabridged. Source location: Random House, Inc. http://dictionary.reference.com/browse/adjacent, Nov. 18, 2011, p. 1.*

* cited by examiner

*Primary Examiner* — Jeff Piziali
(74) *Attorney, Agent, or Firm* — McClure, Qualey & Rodack, LLP

(57) ABSTRACT

A touchpad assembly for used in a housing of an electronic device is provided. The touchpad assembly includes: a touchpad and a slider. The touchpad is disposed in the housing, and includes a touch bump. The slider includes a base and a plurality of top abutment surfaces. The slider is slidably disposed in the housing, causing the touch bump to be correspondingly positioned on any of the top abutment surfaces to generate a touch stroke. The plurality of top abutment surfaces is arranged on an upper surface of the base, and there is a height difference between adjacent ones of the top abutment surfaces, causing the touch stroke to increase. An adjustable stroke of a touchpad is implemented, so that an idle stroke is increased when the touch of the touchpad is weak or dead, and the idle stroke is reduced when the touch of the touch panel is intense, thereby achieving a good pressing touch.

11 Claims, 8 Drawing Sheets

TOUCHPAD ASSEMBLY

CROSS-REFERENCE TO RELATED APPLICATION

This non-provisional application claims priority under 35 U.S.C. § 119(a) to Patent Application No. 201910265024.2 filed in China, P.R.C. on Apr. 3, 2019, the entire contents of which are hereby incorporated by reference.

BACKGROUND

Technical Field

The present disclosure relates to a touchpad assembly, and in particular, to a touchpad assembly capable of regulating a touch stroke.

Related Art

Nowadays, the design of touch strokes of notebook electronic products is mostly fixed and unadjustable. For a designed fixed touch stroke, due to the design, assembly tolerance and other reasons, the touch may be excessively large, weak, or even dead in actual use. Moreover, different users have different operating touch requirements when operating a touchpad. For a touchpad with a fixed and unadjustable touch stroke, it is difficult to meet operating touch requirements of most users.

SUMMARY

Embodiments of the present invention provide a touchpad assembly. An adjustable stroke of a touchpad is implemented, so that an idle stroke is increased when the touch of the touchpad is weak or dead, and the idle stroke is reduced when the touch of the touch panel is intense, thereby achieving a good pressing touch.

To achieve the foregoing purpose, the embodiments of the present invention provide a touchpad assembly for used in a housing of an electronic device. The touchpad assembly includes a touchpad and a slider. The touchpad is disposed in the housing, and includes a touch bump. The slider includes a base and a plurality of top abutment surfaces. The slider is slidably disposed in the housing, causing the touch bump to be correspondingly positioned on any of the top abutment surfaces to generate a touch stroke. The plurality of top abutment surfaces is arranged on an upper surface of the base, and there is a height difference between adjacent ones of the top abutment surfaces, causing the touch stroke to increase.

In this way, because the top abutment surfaces have different heights, distances between the touch bump and the top abutment surfaces are different when the slider slides to cause the touch bump to correspond to different top abutment surfaces, thereby changing the touch stroke. A user can manually adjust the slider to change the touch stroke, so that a desired pressing touch is achieved through adjustment.

In some embodiments, the height difference between two adjacent top abutment surfaces may range from 0.05 to 0.3 mm. When a pressing stroke has a small distance difference such as 0.05 or 0.1 mm, a touch force will have a difference of about 30 g to 50 g. If the pressing stroke is adjusted by over 0.3 mm at a single time, the touch force will change excessively, and thus it is difficult to meet a fine-tuning requirement of the user. Therefore, 0.05 to 0.3 mm is used as an adjustment spacing of the touch stroke, which allows most users to achieve the desired operating touch through adjustment.

In some embodiments, a height difference between a highest one and a lowest one of the top abutment surfaces may be 0.5 mm. Then, the height difference between top abutment surfaces and the quantity of required top abutment surfaces are set according to the desired operating touch. For example, if the height difference between a highest one and a lowest one of the top abutment surfaces is 0.5 mm, and the height difference between two adjacent top abutment surfaces is 0.05 mm, ten top abutment surfaces will be provided, which allows users to adjust according to requirements.

In some embodiments, the touchpad assembly further includes a positioning member disposed in the housing, and the positioning member includes a first side wall, a second side wall, and a connecting portion. The first side wall and the second side wall are disposed in parallel on both sides of the connecting portion. The first side wall is provided with a plurality of grooves. The slider further includes a protrusion provided on a side of the base, and when the slider slides between the first side wall and the second side wall of the positioning member, the protrusion is correspondingly accommodated in any of the grooves. Therefore, the protrusion leaves one groove and then enters another groove during each slide, so that the user is provided with an operation feel when sliding the slider.

In some embodiments, the base is provided with another protrusion on another side opposite to the side on which the protrusion is provided. A friction force between the slider and the second side wall may be reduced by making the another protrusion in contact with the second side wall.

In some embodiments, the connecting portion of the positioning member includes a sliding rail, and the base slides on the sliding rail. Therefore, friction between a bottom surface of the base and the connecting portion of the positioning member is reduced, and the sliding is smoother. Further, a lower surface of the base may include two bump rails, and the base slides on the sliding rail through the two bump rails. Since the bump rails are arranged to be perpendicular to the sliding rail, compared with a face-to-line contact between the bottom surface of the base and the sliding rail, a point-to-point contact between the bump rail and the sliding rail during sliding may also reduce friction force.

In some embodiments, the touchpad assembly may further include an operating member, and the operating member passes through the positioning member to be connected to the slider, to drive the slider to slide in the positioning member. To facilitate an adjustment operation of the user, an operating member may be added to drive the slider to slide in the positioning member.

In some embodiments, the connecting portion of the positioning member includes a first limiting portion and a second limiting portion, and the operating member slides between the first limiting portion and the second limiting portion. Since the operating member passes through the positioning member to be connected to the slider, the first limiting portion and the second limiting portion may be provided on the positioning member, to limit a sliding range of the operating member and limit a sliding range of the slider.

In some embodiments, the operating member is provided with a plurality of sliding bumps on a surface facing the connecting portion, and the sliding bumps abut against the connecting portion. The sliding bumps are provided, so as to reduce a contact area between the operating member and the connecting portion, thereby reducing a friction force during mutual sliding.

In some embodiments, the operating member includes a plurality of hooks, the slider includes a plurality of through holes, and the hooks pass through the through holes and are buckled on the slider, so that the operating member is connected to the slider to drive the slider to slide.

In some embodiments, the connecting portion is provided with a gear on a surface facing the operating member, the operating member is provided with a rack on a side corresponding to the gear, and the gear meshes with the rack. Through the meshing design of gear and rack, the operating member may be driven to move by turning the gear, and the range of movement may be better controlled by using the gear.

DETAILED DESCRIPTION

Figure 1:
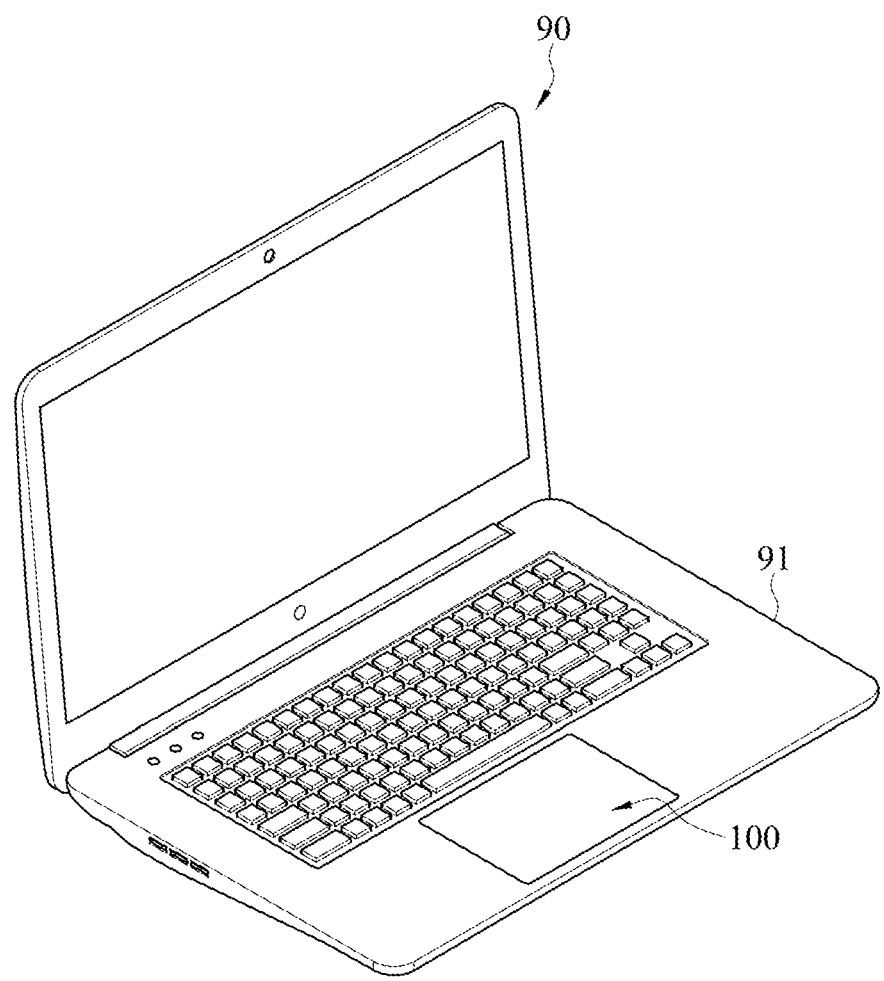
FIG. 1 is a schematic diagram of an electronic device according to a first embodiment of the present invention.
Figure 2:
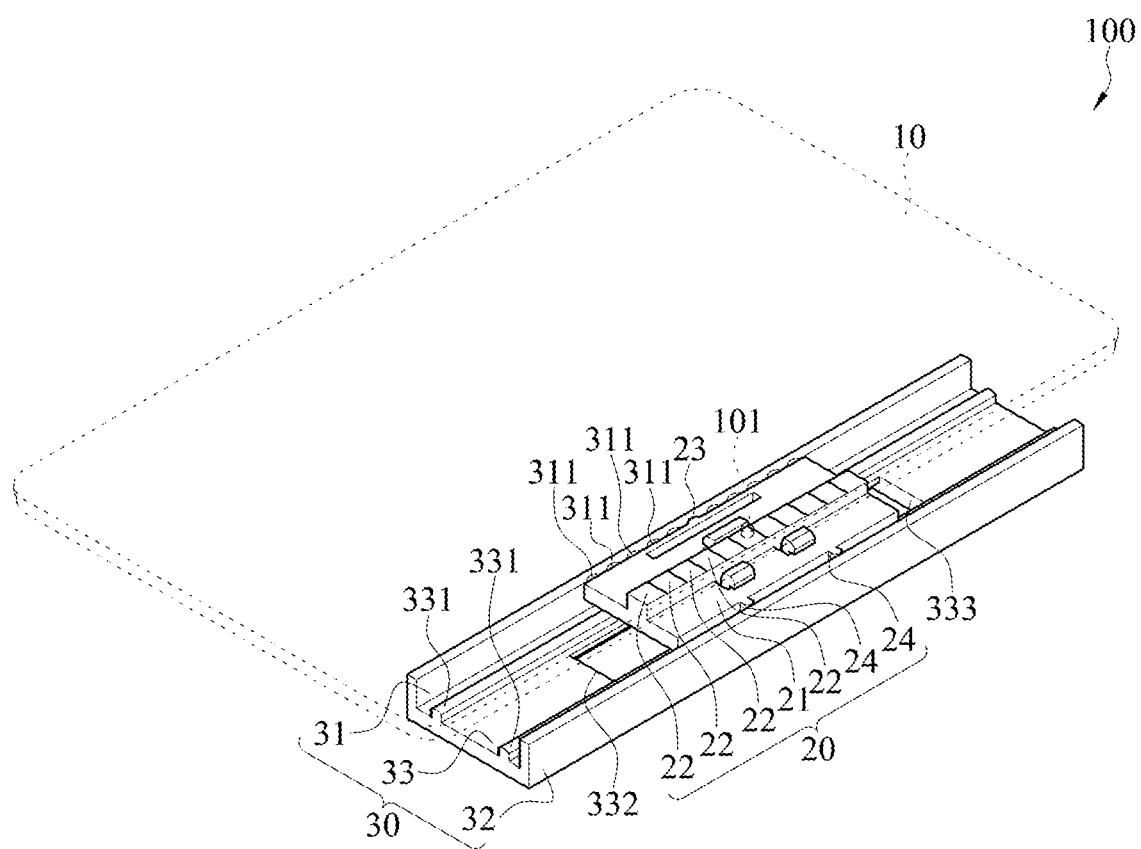
FIG. 2 is a schematic diagram of a touchpad assembly according to the first embodiment of the present invention.
Figure 3:
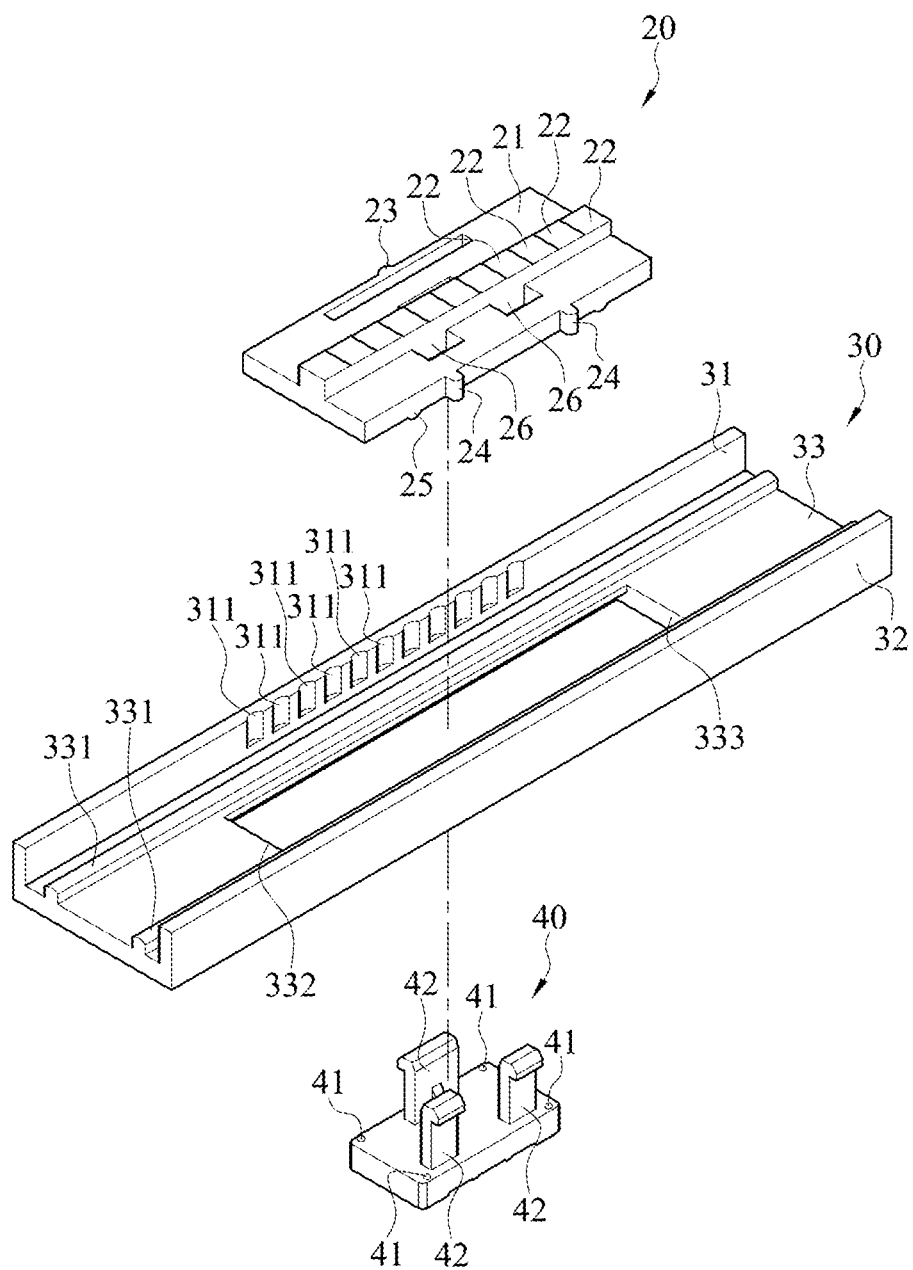
FIG. 3 is a partial exploded view of the touchpad assembly according to the first embodiment of the present invention.
Figure 4:
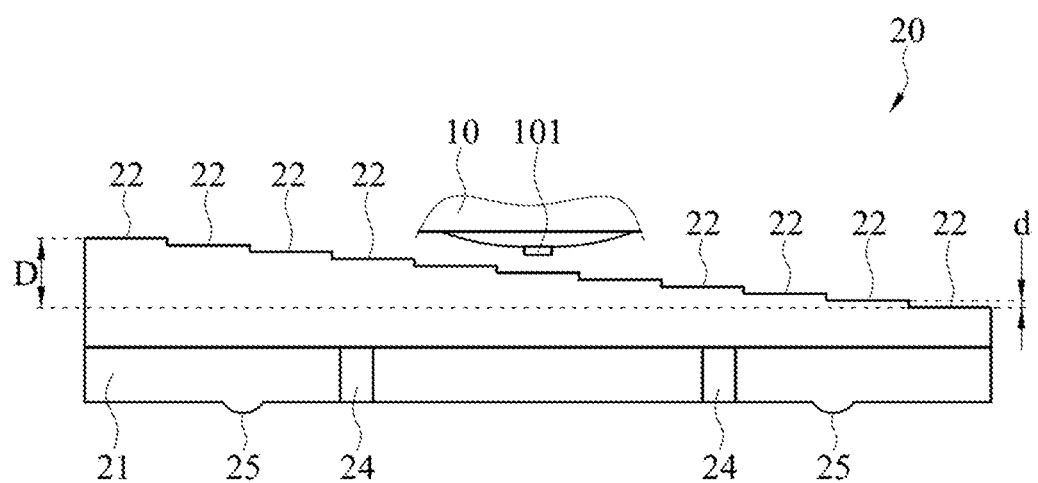
FIG. 4 is a schematic side view of a touch bump and a slider of a touchpad according to the first embodiment of the present invention.

Referring to FIG. 1 to FIG. 4 first, FIG. 1 is a schematic diagram of an electronic device according to a first embodiment of the present invention, FIG. 2 is a schematic diagram of a touchpad assembly according to the first embodiment of the present invention, FIG. 3 is a partial exploded view of the touchpad assembly according to the first embodiment of the present invention, and FIG. 4 is a schematic side view of a touch bump and a slider of a touchpad according to the first embodiment of the present invention. As shown in FIG. 1, a touchpad assembly 100 in this embodiment is for used in a housing 91 of an electronic device 90. The touchpad assembly 100 includes a touchpad 10 and a slider 20. The touchpad 10 is disposed in the housing 91 for a user to perform a touch operation. As shown in FIG. 2, the touchpad 10 includes a touch bump 101. The touch bump 101 is disposed on another side opposite to a touch operation surface, that is, disposed on a surface of the touchpad 10 that faces the inside of the housing.

The slider 20 includes a base 21 and a plurality of top abutment surfaces 22. In this embodiment, the plurality of top abutment surfaces 22 is arranged on an upper surface of the base 21, and there is a height difference d between adjacent ones of the top abutment surfaces 22 (referring to FIG. 4). The slider 20 is slidably disposed in the housing 91, causing the touch bump 101 to be correspondingly positioned on any of the top abutment surfaces 22 to generate a touch stroke. Referring to the side view in FIG. 4, heights of the plurality of top abutment surfaces 22 decrease step by step from left to right, so that the touch stroke between the touch bump 101 and the top abutment surfaces 22 increases from left to right. In this embodiment, the height difference d between two adjacent top abutment surfaces 22 stays the same, that is, the heights of the top abutment surfaces 22 continuously decrease from left to right with a fixed height difference d. However, in other embodiments, the height difference d between two adjacent top abutment surfaces may also be a different fixed value.

When the user wants to change the touch stroke to achieve an appropriate pressing touch through adjustment, the user may slide the slider 20, to cause the touch bump 101 to correspond to different top abutment surfaces 22 of the slider 20. Due to different heights of the top abutment surfaces 22, when the slider 20 slides to cause the touch bump 101 to correspond to different top abutment surfaces 22, distances between the touch bump 101 and the top abutment surfaces 22 are different, thereby changing the touch stroke of the touchpad 10. In this way, the user can manually adjust the slider 20 to change the touch stroke, so that the desired pressing touch is achieved through adjustment.

Referring to FIG. 4, the height difference d between two adjacent top abutment surfaces 22 may range from 0.05 to 0.3 mm. When a pressing stroke has a small distance difference such as 0.05 or 0.1 mm, a touch force will have a difference of about 30 g to 50 g. If the pressing stroke is adjusted by over 0.3 mm at a single movement, the touch force will change excessively at once, and thus it is difficult to meet a fine-tuning requirement of the user. Therefore, 0.05 to 0.3 mm is used as an adjustment spacing of the touch stroke, which allows most users to achieve desired operating touch through adjustment. In addition, in this embodiment, a height difference D between a highest one and a lowest one of all the top abutment surfaces 22 is set to be 0.5 mm. Then, the height difference D between top abutment surfaces 22 and the quantity of required top abutment surfaces 22 are set according to the desired operating touch. For example, the height difference D between a highest one and a lowest one of the top abutment surfaces 22 is set to be 0.5 mm, and the height difference d between two adjacent top abutment surfaces 22 is set to be 0.05 mm. Therefore, ten top abutment surfaces 22 will be provided, which allows users to adjust according to requirements.

Referring to FIG. 2 and FIG. 3, as shown in FIG. 2, the touchpad assembly 100 in this embodiment further includes a positioning member 30 disposed in the housing 91, and the positioning member 30 includes a first side wall 31, a second side wall 32, and a connecting portion 33. In other embodiments, the positioning member 30 and the housing 91 may be integrally formed, that is, the connecting portion 33 is formed on an outer surface of the housing 91, and the first side wall 31 and the second side wall 32 are protruded toward the inside. In this embodiment, the positioning member 30 separately disposed in the housing 91 is used as an example for description. As shown in FIG. 2 and FIG. 3, the first side wall 31 and the second side wall 32 are disposed in parallel on both sides of the connecting portion 33. The first side wall 31 is provided with a plurality of grooves 311. The slider 20 further includes a protrusion 23 provided on a side of the base 21. When the slider 20 slides between the first side wall 31 and the second side wall 32 of the positioning member 30, the protrusion 23 is correspondingly accommodated in any of the plurality of grooves 311.

Therefore, the protrusion 23 leaves one groove 311 and then enters another groove 311 during each slide, so that the user is provided with an operating feel when sliding the slider 20.

In addition, the quantity and positions of the grooves 311 may correspond to the quantity and positions of the top abutment surfaces 22. For example, ten top abutment surfaces 22 are provided in this embodiment, and therefore, there are also ten grooves 311. Spacing between the adjacent grooves 311 is set, so that when the protrusion 23 of the slider 20 correspondingly moves from one groove 311 to be accommodated in another groove 311, a center position of another top abutment surface 22 corresponds to the touch bump 101. In this way, the user can determine, based on the operating feel of the protrusion 23, whether the top abutment surface 22 corresponding to the touch bump 101 has been changed.

To reduce a friction force between the slider 20 and the positioning member 30 when the slider 20 slides in the positioning member 30, the base 21 is provided with another protrusion 24 on another side opposite to the side on which the protrusion 23 is disposed, and the another protrusion 24 abuts against the second side wall 32. In this embodiment, there are two protrusions 24, and in other embodiments, one or more protrusions 24 may also be provided. By making the another protrusion 24 in contact with the second side wall 32, a contact between one side of the slider 20 and the second side wall 32 of the positioning member 30 changes from a surface contact to a point contact, thereby greatly reducing the friction force caused by the slider 20 when sliding relative to the positioning member 30.

Figure 5:
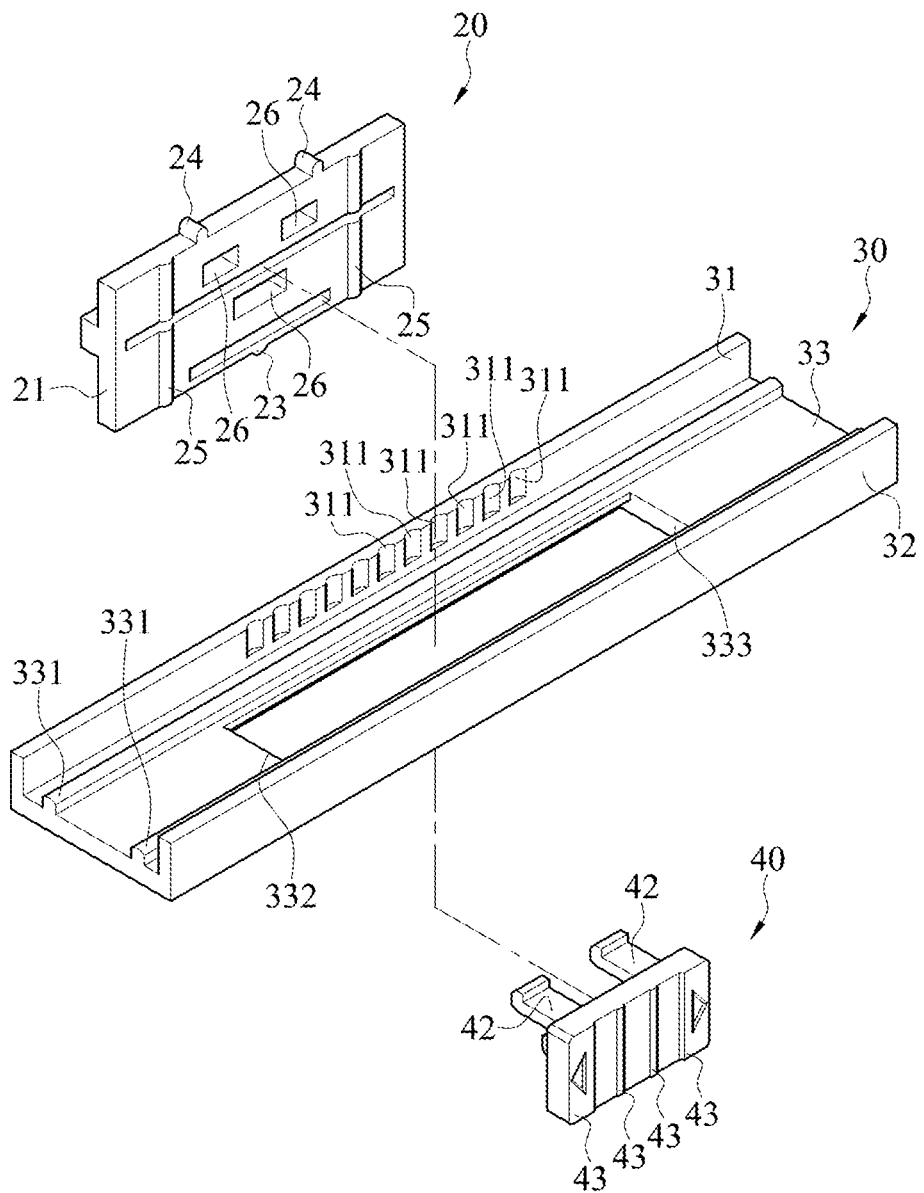
FIG. 5 is a partial exploded view of the touchpad assembly from another perspective according to the first embodiment of the present invention.
Figure 6:
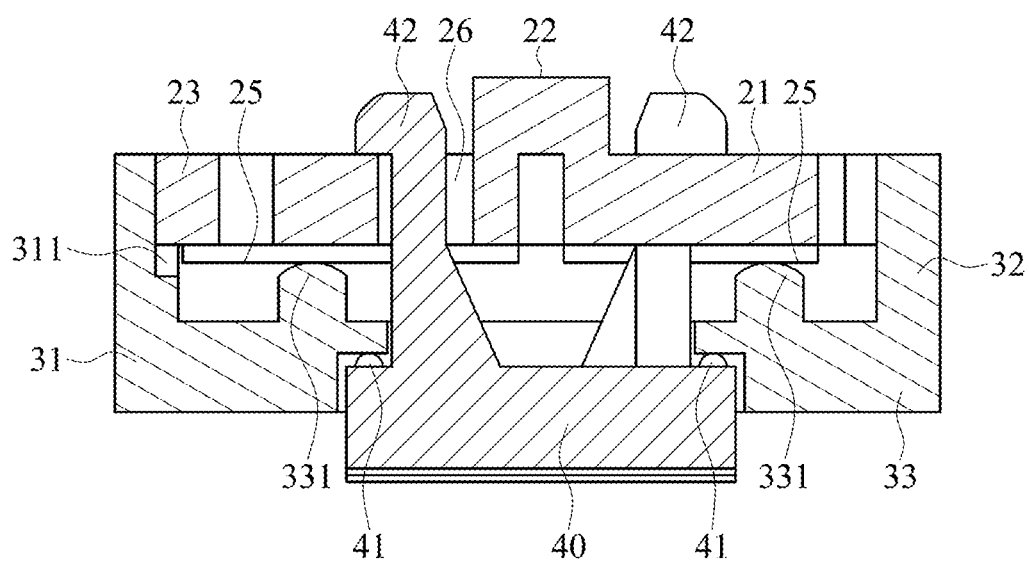
FIG. 6 is a partial sectional view of the touchpad assembly according to the first embodiment of the present invention.

In addition, two sliding rails 331 are disposed on the connecting portion 33 of the positioning member 30, and the base 21 slides on the sliding rails 331. Therefore, friction between a bottom surface of the base 21 and the connecting portion 33 of the positioning member 30 is reduced, and the sliding is smoother. Further, referring to FIG. 5 and FIG. 6 together, FIG. 5 is a partial exploded view of the touchpad assembly from another perspective according to the first embodiment of the present invention, and FIG. 6 is a partial sectional view of the touchpad assembly according to the first embodiment of the present invention. As shown in FIG. 5, a lower surface of the base 21 includes two bump rails 25, and the base 21 slides on the sliding rails 331 through the two bump rails 25. Since the bump rails 25 are arranged to be perpendicular to the sliding rails 331, a contact between the bump rails 25 and the sliding rails 331 during sliding becomes a point-to-point contact (as shown in FIG. 6), which can also reduce the friction force compared with a face-to-line contact between the bottom surface of the base 21 and the sliding rails 331.

Referring to FIG. 2 and FIG. 3, in this embodiment, the touchpad assembly 100 further includes an operating member 40, and the operating member 40 passes through the positioning member 30 to be connected to the slider 20, to drive the slider 20 to slide in the positioning member 30. Adding an operating member 40 may facilitate an adjustment operation of the user, so as to drive the slider 20 to slide in the positioning member 30. When the positioning member 30 is integrally formed with the housing 91, the operating member 40 will be exposed from the outer surface of the housing 91, and the user can operate the operating member 40 outside the housing 91 to drive the slider 20 to slide, to adjust the slider 20 to a desired location. As shown in FIG. 5, an outer surface of the operating member 40 may be provided with a plurality of operating protrusions 43, to enhance the operating feel of the user during operation.

In addition, the connecting portion 33 of the positioning member 30 includes a first limiting portion 332 and a second limiting portion 333, and the operating member 40 slides between the first limiting portion 332 and the second limiting portion 333. Since the operating member 40 passes through the positioning member 30 to be connected to the slider 20, the first limiting portion 332 and the second limiting portion 333 are disposed on the positioning member 30, which can limit a sliding range of the operating member 40 and limit a sliding range of the slider 20. For example, when the operating member 40 is moved to the first limiting portion 332, the protrusion 23 of the slider 20 will be accommodated in the groove 311 located on the leftmost side. When the operating member 40 is moved to the second limiting portion 322, the protrusion 23 of the slider 20 will be accommodated in the groove 311 located on the rightmost side.

Similarly, to reduce the friction force between the operating member 40 and the positioning member 30 during mutual sliding, as shown in FIG. 2 and FIG. 5, the operating member 40 is provided with a plurality of sliding bumps 41 on a surface facing the connecting portion 33 of the positioning member 30, and the sliding bumps 41 abut against the connecting portion 33. By providing the sliding bumps 41, a contact area between the operating member 40 and the connecting portion 33 is reduced, to reduce the friction force during mutual sliding.

Referring to FIG. 2, FIG. 5 and FIG. 6 together, the operating member 40 includes a plurality of hooks 42, the slider 20 includes a plurality of through holes 26, and the hooks 42 pass through the through holes 26 and are buckled on the slider 20, so that the operating member 40 is connected to the slider 20, to drive the slider 20 to slide. In other embodiments, the operating member 40 and the slider 20 may also be connected by bonding, locking, and other methods. In this embodiment, the way of buckling is used, so that the structure is simple, few components are used, the assembling is easy, and there is no need to add excessive assembly processes.

Figure 7:
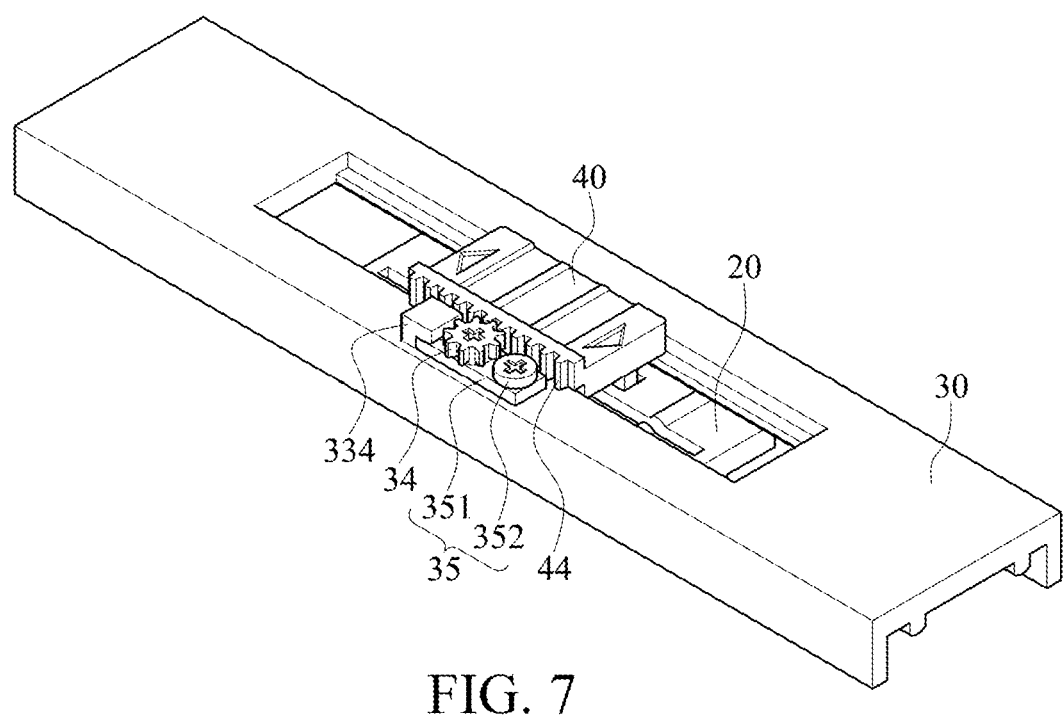
FIG. 7 is a partial schematic diagram of a touchpad assembly according to a second embodiment of the present invention.
Figure 8:
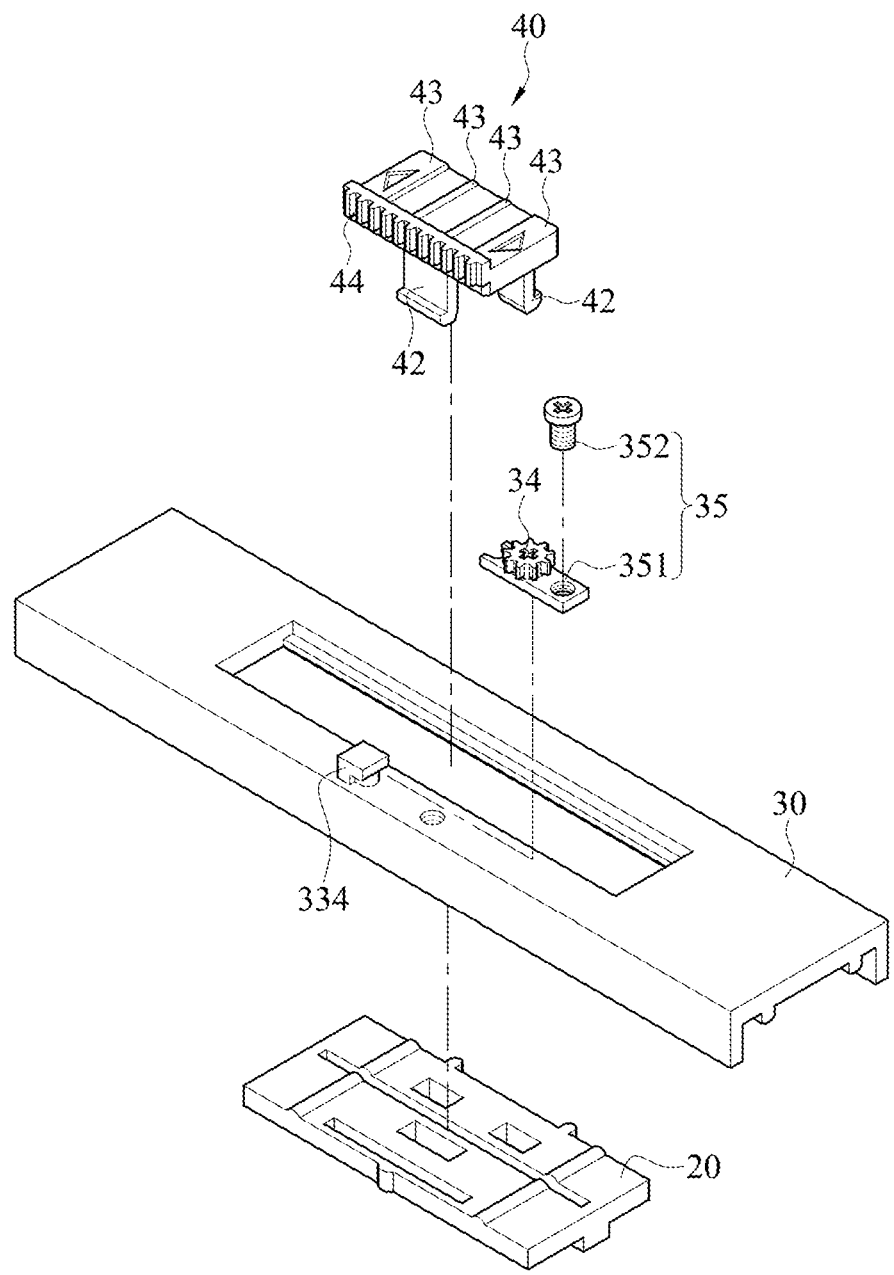
FIG. 8 is a partial exploded view of the touchpad assembly according to the second embodiment of the present invention.

Referring to FIG. 7 and FIG. 8, FIG. 7 is a partial schematic diagram of a touchpad assembly according to a second embodiment of the present invention, and FIG. 8 is a partial exploded view of the touchpad assembly according to the second embodiment of the present invention. The following describes the touchpad assembly according to the second embodiment of the present invention with reference to FIG. 7 and FIG. 8. In this embodiment, components having the same functions, structures, and link relationships as those of the first embodiment will be denoted by the same component symbols and will not be described again. A difference between this embodiment and the first embodiment is that, the connecting portion 33 is provided with a gear 34 on a surface facing the operating member 40, the operating member 40 is provided with a rack 44 on a side corresponding to the gear 34, and the gear 34 meshes with the rack 44. Through the meshing design of the gear 34 and the rack 44, the operating member 40 may be driven to move by turning the gear 34, and the range of movement may be better controlled with small amplitude by using the gear 34.

Further, a positioning hook portion 334 may be disposed on the connecting portion 33, and the gear 34 is assembled on the connecting portion 33 through an assembly member 35 including a bottom plate 351 and a screw 352. As shown in FIG. 7 and FIG. 8, the gear 34 may be first assembled on the bottom plate 351, one end of the bottom plate 351 is assembled on the positioning hook portion 334, and the other end is locked by using the screw 352, so that the gear 34 is assembled on the connecting portion 33. In addition, a cross hole may be provided in the gear 34. When the user wants to rotate the gear 34 to drive the operating member 40 to move, a cross screwdriver may be used to rotate the gear 34.

Although the present invention is described with reference to the above embodiments, the embodiments are not intended to limit the present invention. A person of ordinary skill in the art may make variations and modifications without departing from the spirit and scope of the present invention. Therefore, as long as the modifications and variations are within the scope of the appended claims and the equivalents thereof, the modifications and variations fall within the scope of the present invention.

What is claimed is:

1. A touchpad assembly, for used in a housing of an electronic device, the touchpad assembly comprising:
   a touchpad, disposed in the housing and comprising a touch bump;
   a slider, comprising a base and a plurality of top abutment surfaces, and slidably disposed in the housing, causing the touch bump to be correspondingly positioned on any of the top abutment surfaces to generate a touch stroke, wherein the top abutment surfaces are arranged on an upper surface of the base, and there is a height difference between two of the top abutment surfaces which are next to each other and heights of the plurality of top abutment surfaces decrease step by step from one side to another side of the base, causing the touch stroke to increase; and
   a positioning member disposed in the housing, the positioning member comprises a first side wall, a second side wall, and a connecting portion, the connecting portion has opposite sides, the first side wall and the second side wall are disposed in parallel on the opposite sides of the connecting portion, a plurality of grooves is provided on the first side wall;
   wherein the slider further comprises a protrusion provided on a side of the base, and when the slider slides between the first side wall and the second side wall of the positioning member, the protrusion is correspondingly accommodated in any of the grooves.

2. The touchpad assembly according to claim 1, wherein the height difference ranges from 0.05 to 0.3 mm.

3. The touchpad assembly according to claim 1, wherein a height difference between a highest one and a lowest one of the top abutment surfaces is 0.5 mm.

4. The touchpad assembly according to claim 1, wherein the base is provided with another protrusion on another side opposite to the side on which the protrusion is provided, and the another protrusion abuts against the second side wall.

5. The touchpad assembly according to claim 1, wherein the connecting portion of the positioning member comprises a sliding rail, and the base slides on the sliding rail.

6. The touchpad assembly according to claim 5, wherein a lower surface of the base comprises two bump rails, and the base slides on the sliding rail through the two bump rails.

7. The touchpad assembly according to claim 1, wherein the touchpad assembly further comprises an operating member that passes through the positioning member to be connected to the slider, to drive the slider to slide in the positioning member.

8. The touchpad assembly according to claim 7, wherein the connecting portion of the positioning member comprises a first limiting portion and a second limiting portion, and the operating member slides between the first limiting portion and the second limiting portion.

9. The touchpad assembly according to claim 7, wherein the operating member is provided with a plurality of sliding bumps on a surface facing the connecting portion, and the sliding bumps abut against the connecting portion.

10. The touchpad assembly according to claim 7, wherein the operating member comprises a plurality of hooks, the slider comprises a plurality of through holes, and the hooks pass through the through holes and are buckled on the slider.

11. The touchpad assembly according to claim 7, wherein the connecting portion is provided with a gear on a surface facing the operating member, the operating member is provided with a rack on a side corresponding to the gear, and the gear meshes with the rack.

* * * * *